US012061730B2

(12) United States Patent
Singh et al.

(10) Patent No.: US 12,061,730 B2
(45) Date of Patent: Aug. 13, 2024

(54) SECURITY ASSESSMENT APPARATUS, SECURITY ASSESSMENT METHOD, AND NON-TRANSITORY COMPUTER READABLE MEDIUM

(71) Applicant: NEC Corporation, Tokyo (JP)

(72) Inventors: Taniya Singh, Tokyo (JP); Masafumi Watanabe, Tokyo (JP); Hirofumi Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 17/430,069

(22) PCT Filed: Feb. 14, 2019

(86) PCT No.: PCT/JP2019/005403
§ 371 (c)(1),
(2) Date: Aug. 11, 2021

(87) PCT Pub. No.: WO2020/166016
PCT Pub. Date: Aug. 20, 2020

(65) Prior Publication Data
US 2022/0147659 A1    May 12, 2022

(51) Int. Cl.
*G06F 21/00*    (2013.01)
*G06F 21/55*    (2013.01)
(Continued)

(52) U.S. Cl.
CPC .......... *G06F 21/73* (2013.01); *G06F 21/554* (2013.01); *G06F 21/577* (2013.01); *G06F 2221/034* (2013.01)

(58) Field of Classification Search
CPC ...... G06F 21/73; G06F 21/554; G06F 21/577; G06F 2221/034
See application file for complete search history.

(56) References Cited

U.S. PATENT DOCUMENTS 8,181,247 B1 * 5/2012 Pavlyushchik ....... G06F 21/566
726/22
8,955,105 B2 * 2/2015 Hudis .................... H04L 63/20
726/22

(Continued)

FOREIGN PATENT DOCUMENTS

| EP | 3121749 A1 | 1/2017 | |
|---|---|---|---|
| EP | 3180891 B1 * | 11/2019 | ........... G06F 21/577 |
| EP | 3563548 B1 * | 11/2021 | ......... H04L 63/1416 |

OTHER PUBLICATIONS

International Search Report for PCT Application No. PCT/JP2019/005403, mailed on May 21, 2019.

*Primary Examiner* — Kendall Dolly

(57) ABSTRACT

The present disclosure provides a security assessment apparatus, a method, and a program capable of making an assessment of a security risk simply and appropriately. The security assessment apparatus according to the present disclosure is a security assessment apparatus of a facility to be controlled using a controller, including: an identification unit (15) configured to identify a compromised component which puts the facility into an unsafe situation based on data regarding a plurality of components provided in the facility and control program code of the controller, thereby generating a list of the compromised component; and a compromised behavior generating unit (16) configured to generate a compromised behavior of a selected component selected from the list of the compromised component.

18 Claims, 12 Drawing Sheets

(51) Int. Cl.
   *G06F 21/57*   (2013.01)
   *G06F 21/73*   (2013.01)

(56) References Cited

U.S. PATENT DOCUMENTS

| | | | |
|---|---|---|---|
| 10,142,353 B2* | 11/2018 | Yadav | H04L 63/0227 |
| 10,193,868 B2* | 1/2019 | Reubenstein | H04L 63/1441 |
| 10,637,882 B2* | 4/2020 | Gorodissky | H04L 43/50 |
| 2017/0024562 A1* | 1/2017 | Rombouts | G06F 21/52 |
| 2017/0331858 A1* | 11/2017 | Clark, III | H04L 63/1416 |
| 2018/0063171 A1* | 3/2018 | Yamada | G06F 16/951 |
| 2018/0075243 A1* | 3/2018 | Thomas | G06F 30/20 |
| 2018/0276375 A1* | 9/2018 | Arov | G06F 21/85 |
| 2018/0309780 A1* | 10/2018 | Damodaran | H04L 41/145 |
| 2018/0337939 A1* | 11/2018 | Agarwal | G06F 16/26 |
| 2020/0137102 A1* | 4/2020 | Sheridan | H04L 63/105 |

\* cited by examiner

| Component | State Lists | Normal Rules | Compromised Rules |
|---|---|---|---|
| LS001 | | LS001.S = WT001.A | LS001.S = 0 or 1 or 2 or 3 or 4 or 5; |
| MV001 | MV001.A{0,1} MV001.S{0,1} MV001.C{0,1} | MV001.A = MV001.C; MV001.S = MV001.A; | MV001.A = 0 or 1; MV001.S = 0 or 1; |
| PLC001 | | IF LS001.S > 3 then MV001.C = 0; IF LS001.S = 3 then MV001.C = MV001.C; IF LS001.S < 3 then MV001.C = 1; | MV001.C = 1 or 0; |
| WT001 | WT001.A{0,1,2,3,4,5,6} | IF MV001.A = 1 and WT001.A = 0 then WT001.A = 1; IF MV001.A = 1 and WT001.A = 1 then WT001.A = 2; IF MV001.A = 1 and WT001.A = 2 then WT001.A = 3; IF MV001.A = 1 and WT001.A = 3 then WT001.A = 4; IF MV001.A = 1 and WT001.A = 4 then WT001.A = 5; IF MV001.A = 1 and WT001.A = 5 then WT001.A = 6; | |

Fig. 6

| Component | State Lists | Rules (Normal) | Rules (Compromised) |
|---|---|---|---|
| LS001 | | LS001.S = WT001.A | LS001.S = 1 or 2 or 3 or 4 or 5; |
| MV001 | MV001.A[0,1] <br> MV001.S[0,1] <br> MV001.C[0,1] | MV001.A = MV001.C; <br> MV001.S = MV001.A; | MV001.A = 0 or 1; <br> MV001.S = 0 or 1; |
| PLC001 | | IF LS001.S > 3 then MV001.C = 0; <br> IF LS001.S = 3 then MV001.C = MV001.C <br> IF LS001.S < 3 then MV001.C = 1; | MV001.C = 1 or 0; |
| WT001 | WT001.A[0, 1, 2, 3, 4, 5, 6] | IF MV001.A = 1 and WT001.A = 0 then WT001.A = 1; <br> IF MV001.A = 1 and WT001.A = 1 then WT001.A = 2; <br> IF MV001.A = 1 and WT001.A = 2 then WT001.A = 3; <br> IF MV001.A = 1 and WT001.A = 3 then WT001.A = 4; <br> IF MV001.A = 1 and WT001.A = 4 then WT001.A = 5; <br> IF MV001.A = 1 and WT001.A = 5 then WT001.A = 6; | |

Fig. 7

| STEP | WT001.A | LS001.S (Compromised) | MV001.A | MV001.S |
|---|---|---|---|---|
| 1 | LOW(1) | LOW(1) | CLOSED | CLOSED |
| 2 | LOW(1) | LOW(1) | OPEN | OPEN |
| 3 | MEDIUM(2) | MEDIUM(2) | OPEN | OPEN |
| 4 | HIGH(3) | LOW(1) | OPEN | OPEN |
| 5 | HIGH HIGH(4) | LOW(1) | OPEN | OPEN |
| 6 | OVERFLOW(5) | MEDIUM(2) | OPEN | OPEN |

Fig. 8

SECURITY ASSESSMENT APPARATUS, SECURITY ASSESSMENT METHOD, AND NON-TRANSITORY COMPUTER READABLE MEDIUM

This application is a National Stage Entry of PCT/JP2019/005403 filed on Feb. 14, 2019, the contents of all of which are incorporated herein by reference, in their entirety.

TECHNICAL FIELD

The present disclosure relates to a security assessment apparatus, a security assessment method, and a non-transitory computer readable medium.

BACKGROUND ART

Patent Literature 1 discloses a system for detecting a cyber-attack of a Supervisory Control And Data Acquisition (SCADA) system.

Patent Literature 2 relates to the security of computers and discloses a method of detecting and/or protecting against attacks which seek to divert or alter the flow of execution of a program. The method includes the steps: analyzing a reference control flow generated in respect of a portion of code to derive a control flow rule; and evaluating the control flow rule during execution of the portion of code to facilitate detection of a deviation from the reference control flow.

CITATION LIST

Patent Literature

[Patent Literature 1] US2018/276375A1
[Patent Literature 2] EP3121749A1

SUMMARY OF INVENTION

Technical Problem

In the control system using the controller such as the PLC, it has been required to make an assessment of the security risk against cyber-attacks simply and appropriately.

The present disclosure has been made in view of the aforementioned problem and aims to provide a security assessment apparatus, a security assessment method, and a non-transitory computer readable medium capable of making an assessment of the security risk simply and appropriately.

Solution to Problem

A security assessment apparatus according to the present disclosure is a security assessment apparatus of a facility to be controlled using a controller, including: an identification unit configured to identify a compromised component which puts the facility into an unsafe situation based on data regarding a plurality of components provided in the facility and a control program code of the controller, thereby generating a list of the compromised component; and a compromised behavior generating unit configured to generate a compromised behavior of a selected component selected from the list of the compromised component.

A security assessment method according to the present disclosure is a security assessment method of a facility to be controlled using a controller, including: identifying a compromised component which puts the facility into an unsafe situation based on data regarding a plurality of components provided in the facility and a control program code of the controller, generating a list of the compromised component; and a compromised behavior step for generating a compromised behavior of a selected component selected from the list of the compromised component.

A non-transitory computer readable medium according to the present disclosure is a non-transitory computer readable medium storing a program for causing a computer to execute a security assessment method of a facility to be controlled using a controller, the security assessment method including: a step of identifying a compromised component which puts the facility into an unsafe situation based on data regarding a plurality of components provided in the facility and a control program code of the controller, generating a list of the compromised component; and a compromised behavior step for generating a compromised behavior of a selected component selected from the list of the compromised component.

Advantageous Effects of Invention

According to the present disclosure, it is possible to provide a security assessment apparatus, a security assessment method, and a program capable of making an assessment of a security risk simply and appropriately.

BRIEF DESCRIPTION OF DRAWINGS

FIG. 6 is a diagram showing a table of state lists and rules;

FIG. 7 is a table showing rules when the compromised component is a sensor LS001;

FIG. 8 is a table showing one example of attack scenarios when the sensor LS001 is infected with a virus;

DESCRIPTION OF EMBODIMENTS

Specific embodiments are described hereinafter in detail with reference to the drawings. The same or corresponding elements are denoted by the same reference symbols throughout the drawings, and repetitive descriptions are avoided for clarity.

First Embodiment

A security assessment apparatus according to this embodiment makes an assessment of the security risk in an Industrial Control System (ICS). The security assessment apparatus makes an assessment of, for example, the cyber security risk of a control system that uses a controller such as a Programmable Logic Controller (PLC) (e.g., a Supervisory Control And Data Acquisition (SCADA) system).

A facility to be controlled such as a plant, a factory, an infrastructure facility, or a building is, for example, monitored and controlled using a controller such as a Programmable Logic Controller (PLC). A plurality of various devices such as actuators or sensors are provided in the facility to be controlled. The sensors include, for example, a water level indicator, a flowmeter, a thermometer, a manometer, and a speed indicator, and output the results of the measurement to the PLC. The actuator, which is a valve, a motor or the like, operates by commands from the PLC. The PLC is a controller that controls the actuator in accordance with the output from the sensor. Specifically, the PLC controls the facility to be controlled by outputting commands to the actuator in accordance with a PLC code programmed in advance.

Further, besides the actuators and the sensors, physical equipment such as a water storage tank or a pipe that neither receives nor outputs data is provided in the facility to be controlled. The sensor detects information (e.g., a water level) that relates to the physical equipment. Active equipment such as the actuators and the sensors and passive equipment such as the water storage tank are collectively referred to as a component. That is, the component includes, besides the actuators and the sensors, the physical structure that neither receives nor outputs data. The component includes a state of the physical process that serves as a target to be detected by the sensor or a target to be controlled by the actuator. A plurality of components are provided in the facility to be controlled.

Figure 1:
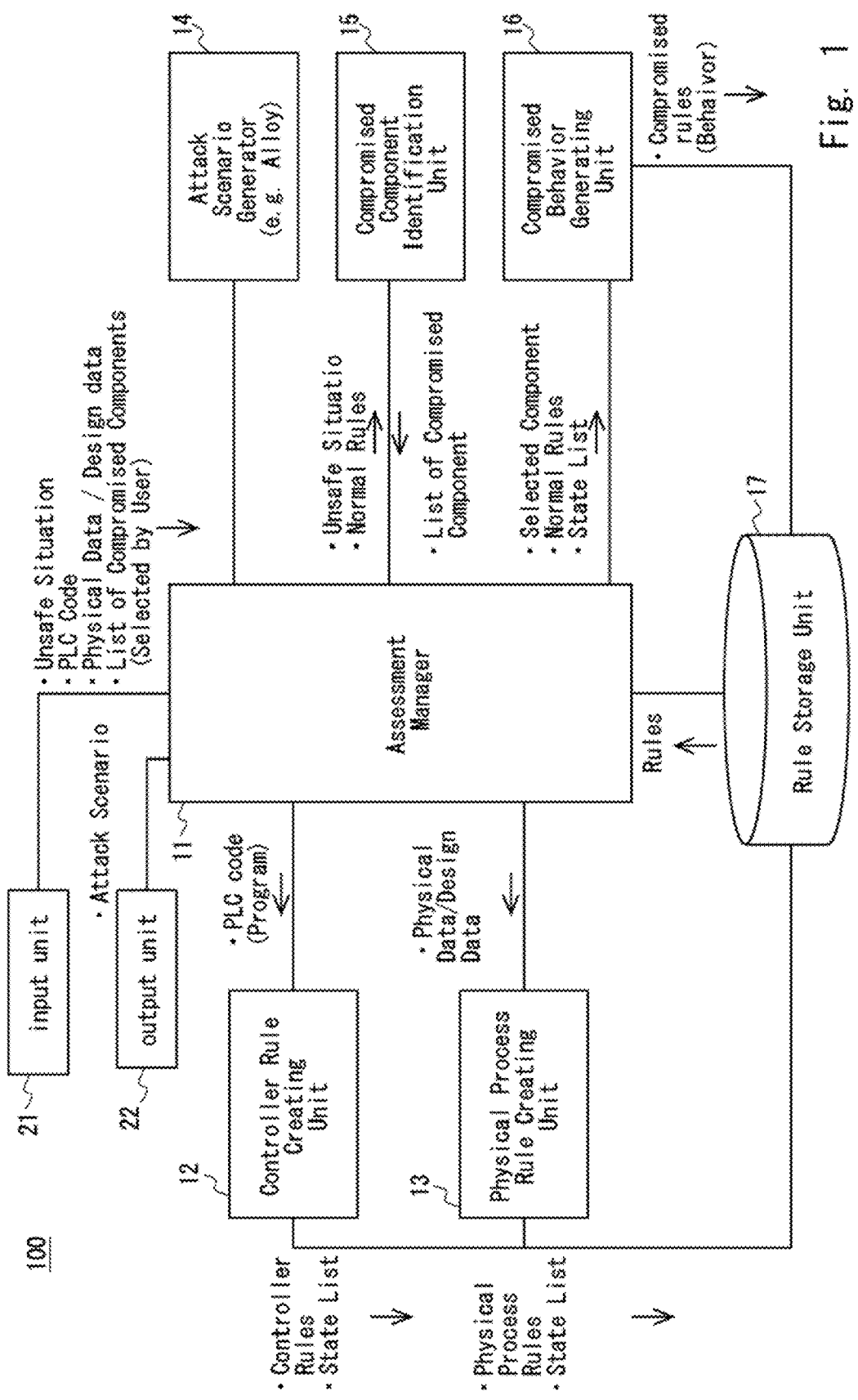
FIG. 1 is a block diagram showing a configuration of a security assessment apparatus.

With reference to FIG. 1, a security assessment apparatus 100 will be explained. FIG. 1 is a functional block diagram showing a configuration of the security assessment apparatus 100. The security assessment apparatus 100 includes an assessment manager 11, a controller rule creating unit 12, a physical process rule creating unit 13, an attack scenario generator 14, a compromised component identification unit 15, a compromised behavior generating unit 16, and a rule storage unit 17. The security assessment apparatus 100 further includes an input unit 21 and an output unit 22.

The input unit 21 includes an input device for accepting input from a user. The input device is, for example, a keyboard, a mouse, and a touch panel. The user manipulates the input device and inputs input data such as an unsafe situation, a PLC code, physical data, and design data. Alternatively, the input unit 21 may acquire data transmitted from another device as the input data. The input unit 21 outputs the unsafe situation, the PLC code, the physical data, and the design data to the assessment manager 11.

The PLC code is a control program for controlling the facility to be controlled such as the plant. In accordance with the PLC code, the actuator operates in accordance with the output from the sensor. When, for example, the water level in the water storage tank detected by the sensor is low, the valve opens in accordance with the PLC code, whereby water is supplied to the water storage tank. When the water level in the water storage tank detected by the sensor is high, the valve is closed in accordance with the PLC code, whereby water supply to the water storage tank is stopped. Accordingly, it is possible to keep the water level in the water storage tank be in a safe range. The unsafe situation is a state in which the physical process such as the water level is not within a safe range defined by a threshold. The user is able to set, for example, a state in which water overflows from the water storage tank or a state in which the amount of water is too small as the unsafe situation.

The physical data is data that relates to various components such as the sensors and the actuators. The physical data is, for example, types of sensors or actuators. Further, the physical data may include data that relates to the input and the output for each of the sensors and actuators. The design data, which is data that relates to the whole facility to be controlled, is, for example, data that relates to the number of components and the arrangement of the components provided in the facility to be controlled.

The assessment manager 11 manages each functional block of the controller rule creating unit 12 to the rule storage unit 17 as a whole. The assessment manager 11 acquires the unsafe situation, the PLC code, and the physical data that have been input by the user. The assessment manager 11 acquires the selected component that the user has selected from the list of compromised components. The assessment manager 11 executes security assessment based on the input from the user and outputs attack scenarios as results of the assessment to the output unit 22. The output unit 22 includes an output device for outputting the attack scenarios to the user. Specifically, the output unit 22 includes, for example, a display monitor that displays the attack scenarios.

The controller rule creating unit 12 acquires the PLC code as the input from the assessment manager 11. The controller rule creating unit 12 creates controller rules and a state list based on the PLC code. The controller rule creating unit 12 stores the controller rules and the state list that have been created in the rule storage unit 17. The controller rules are rules for the PLC to control the respective actuators in a normal state. The state list is a list in which the states that the actuator, the sensor and the controller may take are listed.

The physical process rule creating unit 13 acquires the physical data and the design data as the input from the assessment manager 11. The physical process rule creating unit 13 creates a state list and physical process rules of the physical equipment based on the physical data and the design data. The physical process rule creating unit 13 stores the state list and the physical process rules that have been created in the rule storage unit 17. The physical process rules are rules showing the operations of the respective components in the normal state. For example, the input and the output of the actuator and the sensor are associated with each other. The state list is a list in which the states that the actuator, the sensor, and the passive equipment may take are listed.

The physical process rules and the controller rules in the normal state are referred to as normal rules. The normal rules are rules indicating the normal operations of the respective components in a non-compromised state. In the normal rules, an input variable and an output variable are associated with each other. The state list and the normal rules are created for each component.

The compromised component identification unit 15 acquires the unsafe situation and the normal rules as the input from the assessment manager 11. The compromised component identification unit 15 identifies the compromised component that causes the unsafe situation to generate the list of compromised components. The list of compromised components is the list in which all the components that cause the unsafe situation are listed. The compromised component identification unit 15 generates the list of compromised components for each unsafe situation that has been input. The compromised component identification unit 15 outputs the list of compromised components that has been generated to the assessment manager 11.

The assessment manager 11 causes the output unit 22 to output the list of compromised components. That is, the output unit 22 displays the list of compromised components for each unsafe situation for the user. The user selects one or more compromised components from the list of compromised components by manipulating the input unit 21. The compromised component selected by the user is a selected component. The user identifies the component to be focused as the selected component from the list of compromised components. The assessment manager 11 outputs the selected component to the compromised behavior generating unit 16.

The compromised behavior generating unit 16 acquires the normal rules and the state list as the input from the assessment manager 11. Further, the compromised behavior generating unit 16 acquires the selected component as the input from the assessment manager 11. The compromised behavior generating unit 16 generates the compromised behavior of the selected component based on the normal rules and the state list. The compromised behavior generating unit 16 stores the compromised behavior in the rule storage unit 17 as the compromised rules.

The attack scenario generator 14 acquires the compromised rules and the normal rules as the input from the assessment manager 11. The attack scenario generator 14 generates the attack scenarios based on the compromised rules and the normal rules. The attack scenario generator 14 generates attack scenarios ending in the unsafe situation by running a model checking on the rules. The attack scenario generator 14 outputs the attack scenarios to the assessment manager 11. The assessment manager 11 causes the output unit 22 to output the attack scenarios. The output unit 22 displays the attack scenarios against the selected component that the user has selected for the user.

Figure 2:
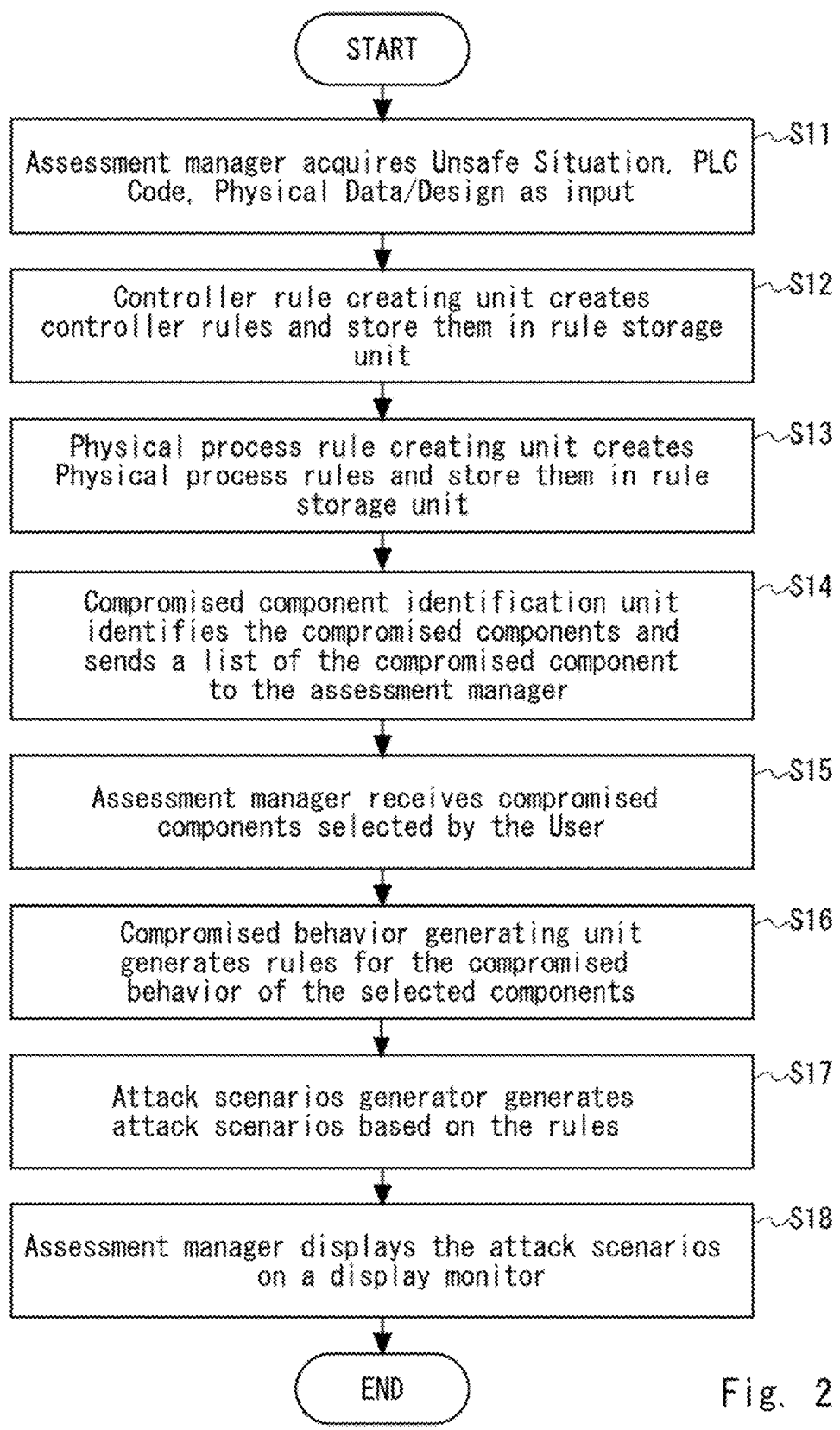
FIG. 2 is a flowchart for describing a security assessment method according to this embodiment.

FIG. 2 is a flowchart showing a security assessment method in the security assessment apparatus 100. First, the assessment manager 11 acquires the unsafe situation, the PLC code, the physical data, and the design data as the input (S11).

The controller rule creating unit 12 creates the controller rules and stores the controller rules in the rule storage unit 17 (S12). The controller rule creating unit 12 refers to the PLC code to generate rules for the PLC to control each of the actuators as the controller rules. The controller rules are, for example, rules in which results of detection in the sensor and commands to be transmitted to the actuator are associated with each other. The controller rule creating unit 12 may create the state list such as the PLC. The state list is a list indicating the state of each component.

The physical process rule creating unit 13 creates the physical process rules and stores the physical process rules in the rule storage unit 17 (S13). The physical process rule creating unit 13 refers to the physical data and the design data to generate the physical process rules. The physical process rule creating unit 13 creates the physical process rules for each component. The physical process rule creating unit 13 may create a state list of an actuator, a sensor and the like. The state list is a list indicating the state of each component.

Figure 3:
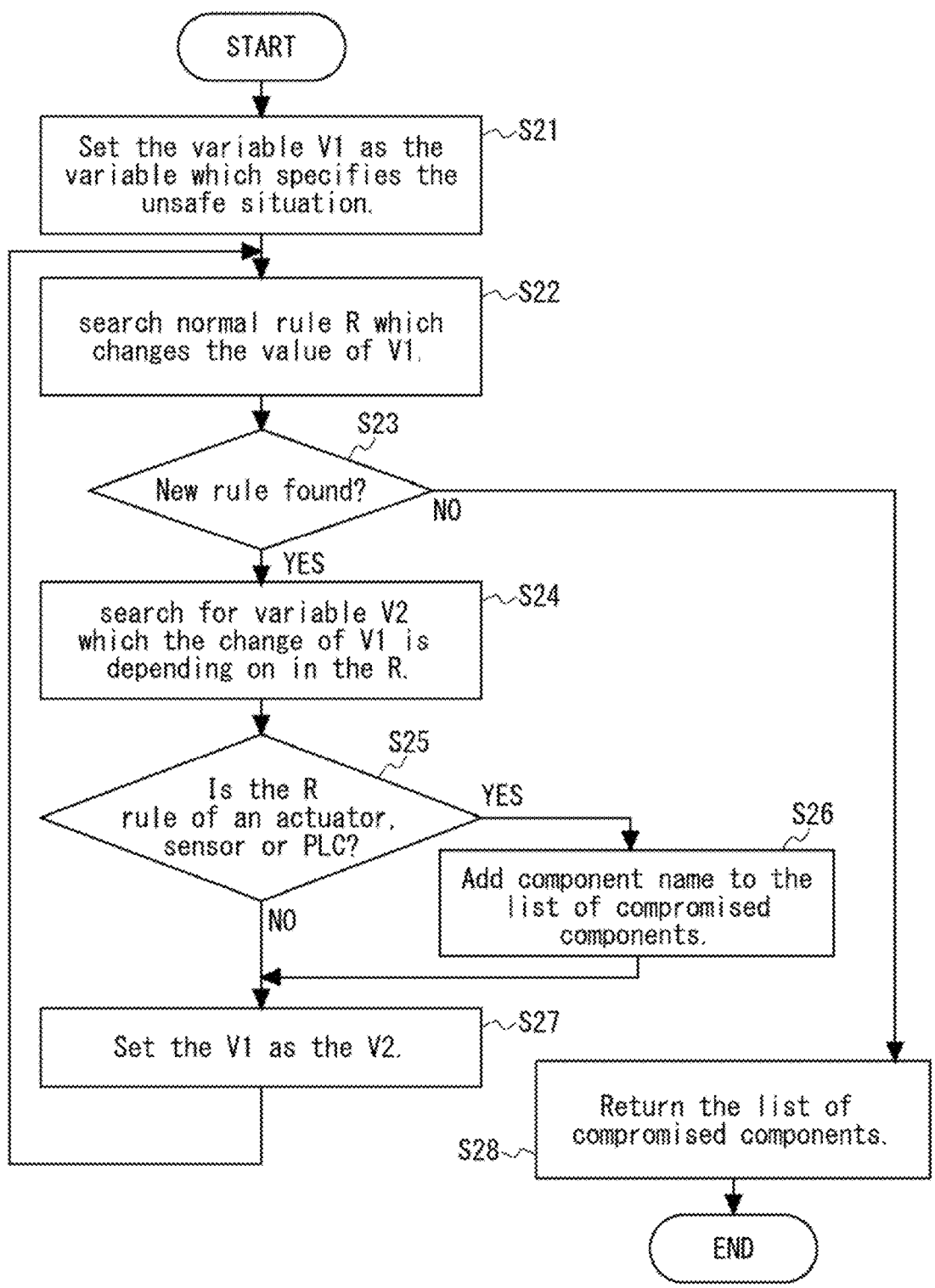
FIG. 3 is a flowchart showing processing in a compromised component identification unit.

The compromised component identification unit 15 identifies the compromised components and sends the list of compromised components to the assessment manager 11 (S14). The processing in which the compromised component identification unit 15 generates the list of compromised components will be explained with reference to FIG. 3. FIG. 3 is a flowchart showing the processing of generating the list of compromised components.

First, the compromised component identification unit 15 sets a variable V1 as the variable which specifies the unsafe situation (S21). When, for example, the state in which the water level in the water storage tank exceeds a threshold is input as the unsafe situation, this water level in the water storage tank becomes the variable V1. Next, the compromised component identification unit 15 searches for a normal rule R which changes the value of the variable V1 (S22). The compromised component identification unit 15 determines whether a new rule has been found (S23). When the new rule has been found, the compromised component identification unit 15 searches for a variable V2 which changes the value of the variable V1 in the normal rule R that has been newly found (S24). That is, the compromised component identification unit 15 refers to the normal rules to find the variable V2 that affects the variable V1. The compromised component identification unit 15 finds the variable V2 that is associated with the variable V1 in the normal rules.

The compromised component identification unit 15 determines whether the normal rule R that has been newly found is the rule of the actuator, the sensor, or the PLC (S25). When the normal rule R is the rule of the actuator, the sensor, or the PLC (YES in S25), the compromised component identification unit 15 adds the component name to the list of compromised components (S26). As described above, the compromised component identification unit 15 refers to the normal rules to identify the new compromised component. Then the compromised component identification unit 15 adds the compromised component that has been newly identified to the list of compromised components.

When the compromised component identification unit 15 has added the compromised component to the list of compromised components, the compromised component identification unit 15 sets the variable V1 as the variable V2 (S27). Further, when the normal rule R that has been newly found is not the rule of the actuator, the sensor, or the PLC (NO in S25), the compromised component identification unit 15 sets the variable V1 as the variable V2 (S27). That is, since the passive equipment is not infected with a virus or malicious behavior, when the normal rule that has been newly searched for is a normal rule of passive equipment such as a water storage tank, there is no increase in the number of compromised components in the list. After the compromised component identification unit 15 has set the variable V1 as the variable V2 (S27), the process goes back to S22, where similar processing is repeated. Further, when it is determined in S23 that a new normal rule has not been found, the compromised component identification unit 15 returns the list of compromised components to the assessment manager 11 (S28). That is, since all the components that cause the unsafe situation have been identified as the compromised components, processing of the compromised component identification unit 15 is ended.

As described above, the compromised component identification unit 15 refers to the normal rules to identify the sensor, the actuator, or the PLC which causes the unsafe situation as the compromised component. That is, the compromised component identification unit 15 searches for the variables associated with the variables that specify the unsafe situation in order in the normal rules. Accordingly, the compromised component identification unit 15 is able to identify all the components that directly or indirectly cause the unsafe situation as the compromised components.

When the user has identified a plurality of unsafe situations, the compromised component identification unit 15 executes the aforementioned processing on each of the unsafe situations. Accordingly, the compromised component identification unit 15 is able to generate the list of compromised components for each unsafe situation. That is, since the variable V1 in Step S21 varies for each unsafe situation, an independent list of compromised components is generated.

With reference once again to FIG. 2, the explanation will be continued. The assessment manager 11 receives the selected components selected by the user (S15). For example, the user manipulates the input unit 21, whereby one or more compromised components is selected from the list of compromised components displayed on the display monitor. The assessment manager 11 receives the compromised component selected by the user as the selected components. The compromised behavior generating unit 16 generates the compromised rules for the compromised behavior of the selected components (S16). The compromised behavior generating unit 16 refers to the state list and the normal rules of the selected components to determine the compromised behavior. The compromised behavior generating unit 16 stores the compromised behavior in the rule storage unit 17 as compromised rules. The compromised behavior generating unit 16 sends the selected component to the assessment manager 11.

Figure 4:
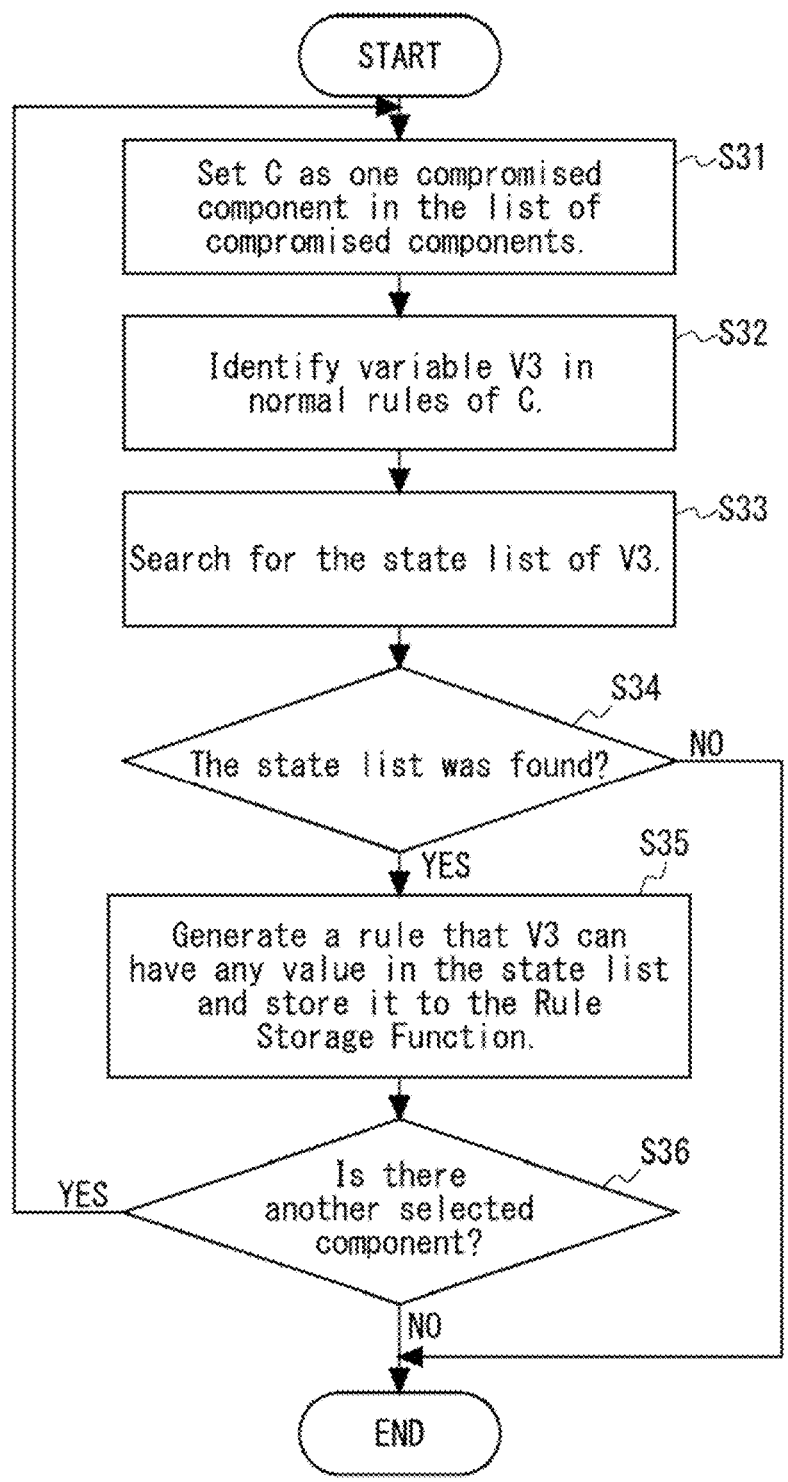
FIG. 4 is a flowchart showing processing in a compromised behavior generating unit.

With reference to FIG. 4, processing of the compromised behavior generating unit 16 will be explained. FIG. 4 is a flowchart showing the processing in the compromised behavior generating unit 16.

The compromised behavior generating unit 16 sets a selected component C as one compromised component in the list of compromised components (S31). In the normal rules of the selected component C, a variable V3 is identified (S32). The variable V3 is a variable that changes the output of the compromised component. The compromised behavior generating unit 16 searches for the state list of the variable V3 (S33). The compromised behavior generating unit 16 determines whether the state list has been found (S34).

When the state list has not been found (NO in S34), the compromised component identification unit 15 ends the processing. When the state list has been found (YES in S34), the compromised component identification unit 15 generates a rule in which the variable V3 is able to have any value and stores this rule in the rule storage unit 17. That is, since the compromised component outputs a value different from the actual value, the rules in which the compromised component outputs all the values that may have becomes the compromised rules.

The compromised behavior generating unit 16 determines whether there is another selected component (S36). Further, when there is another selected component (YES in S36), the process goes back to S31. The above processing is executed on the next selected component. When there is no selected component (NO in S36), the compromised behavior generating unit 16 ends the processing. Accordingly, the compromised behavior for all the selected components is generated, and this compromised behavior is written as the compromised rules.

With reference once again to FIG. 2, the explanation will be continued. The attack scenario generator 14 generates attack scenarios based on the rules stored in the rule storage unit 17 (S17). For example, the unsafe situation is added to the attack scenario generator 14 as an additional input for the attack scenario generator 14 to generate attack scenarios which reaches this unsafe situation. The attack scenario generator 14 generates the attack scenarios based on the compromised rules and the normal rules stored in the rule storage unit 17. The attack scenario generator 14 generates the attack scenarios when the component that has been identified by the user has been infected with a virus and so on. Then the assessment manager 11 causes the display monitor to display the attack scenarios (S18).

Accordingly, the component which is in the facility to be controlled is able to appropriately make an assessment of the compromised behavior. The user is able to grasp, for example, the behavior of the whole facility to be controlled when the actuator or the sensor is infected with a virus by a cyber-attack from an outside in advance.

Figure 5:
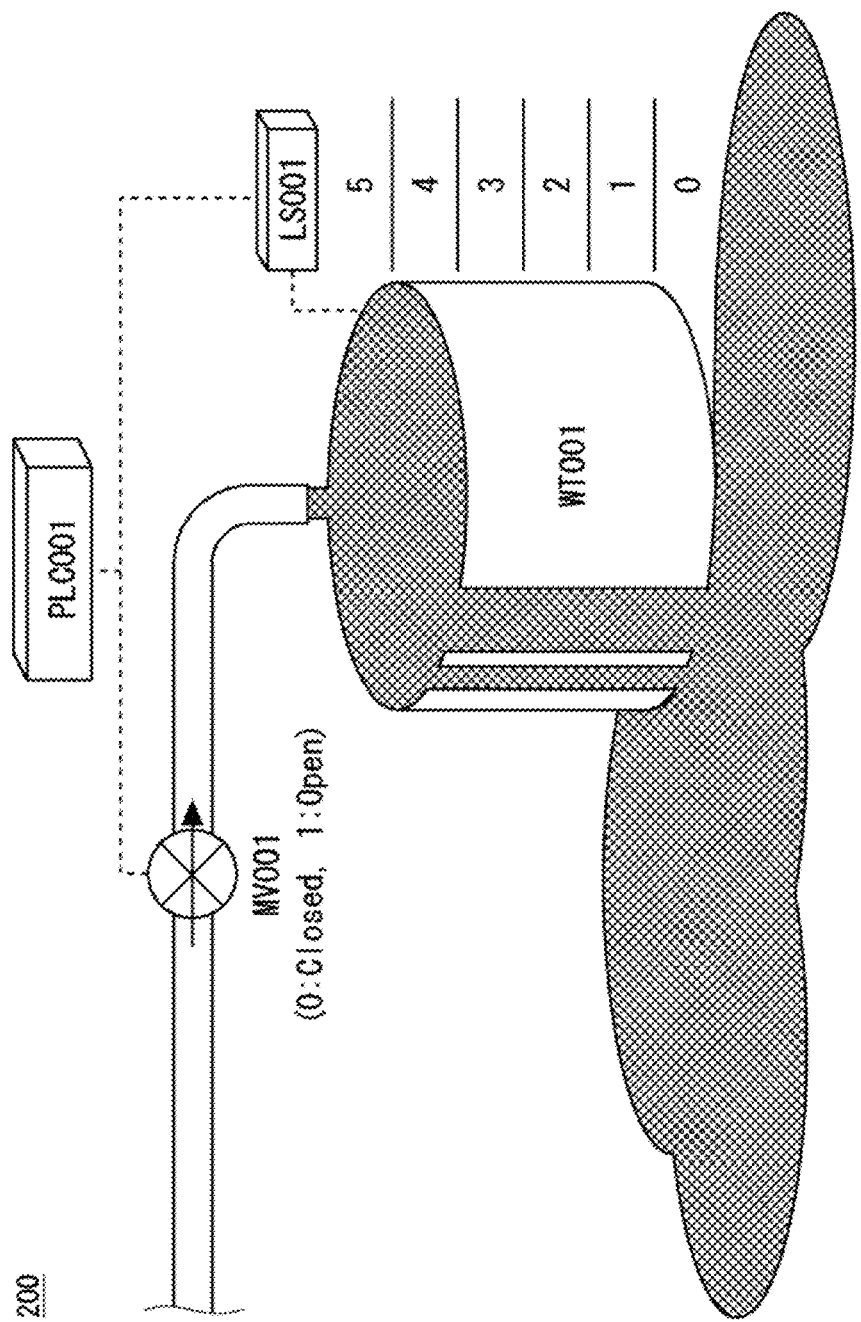
FIG. 5 is a diagram schematically showing a partial configuration of a plant, which is a target to be controlled by a PLC.

FIG. 5 shows a positional example of a configuration of the plant controlled by the PLC, which is a controller. A plant 200 includes a water storage tank WT001, a valve MV001, and a sensor LS001. The sensor LS001 measures the water level in the water storage tank WT001. The sensor LS001 outputs the results of measuring the water level to a controller PLC001. The sensor LS001 outputs, for example, the water level by six stages from 0 to 5. When the water level is 0, the water storage tank WT001 is empty. When the water level is 5, water overflows from the water storage tank WT001. The output of the sensor LS001 is denoted by LS001.S.

The valve MV001 controls the water supplied to the water storage tank WT001. When the valve MV001 opens, water is supplied to the water storage tank WT001. When the valve MV001 is closed, water supply to the water storage tank WT001 is stopped. The controller PLC001 controls the valve MV001 in accordance with the transition in the water storage tank WT001 measured by the sensor LS001. The state in which the valve MV001 is closed is indicated by 0 and the state in which it is open is indicated by 1.

FIG. 6 is a table showing state lists and rules in the plant 200 shown in FIG. 5. The table shown in FIG. 6 includes columns including the component, the state lists, the normal rules, and the compromised rules. That is, the state lists, the normal rules, and the compromised rules are associated with each of the components.

Three kinds of states MV001.A, MV001.S, and MV001.C are stored in the state list of the valve MV001. MV001.A shows an actual state of the valve MV001. MV001.S indicates a state signal transmitted from the valve MV001 to the controller PLC001. MV001.C indicates a command transmitted from the controller PLC001 to the valve MV001. Each of MV001.A, MV001.S, and MV001.C is a variable that has a value of 0 (closed state) or 1 (open state). In this way, the actual state, the state signal, and the command are set in the state list of the valve MV001, which is an actuator. The state list of the valve MV001 is created by the physical process rule creating unit 13.

WT001.A is set in the state list of the water storage tank WT001 as the state indicating the actual water level in the water storage tank WT001. As described above, the water level in the water storage tank WT001 is divided into six different levels. WT001.A is a variable that has a value selected from 0 to 5 in accordance with the actual water level in the water storage tank WT001. The state list of the water storage tank WT001 is the physical process rules created by the physical process rule creating unit 13.

A physical process rule in which LS001.S=WT001.A is set in the normal rule of the sensor LS001. That is, when the sensor LS001 normally operates, the sensor LS001 outputs the results of measuring the water level in the water storage tank WT001. Therefore, the output LS001.S of the sensor LS001 coincides with the actual water level WT001.A in the water storage tank WT001. The normal rule of the sensor LS001 is the physical process rule created by the physical process rule creating unit 13.

A physical process rule in which MV001.A=MV001.C; MV001.C=MV001.S is set in the normal rule of the valve MV001. That is, the actual state MV001.A of the valve MV001 coincides with the command MV001.C from the controller PLC001. Further, the state signal MV001.S transmitted from the valve MV001 to the controller PLC001 coincides with the actual state MV001.A of the valve MV001. In this way, in the normal rules, the input variable and the output variable are associated with each other. Since there are three variables of the actual state, the command, and the state signal in the valve MV001, which is an actuator, two types of normal rules are set. The normal rule of the valve MV001 is the physical process rule created by the physical process rule creating unit 13.

A controller rule for controlling the valve MV001 is set in the normal rule of the controller PLC001 in accordance with the output LS001.S of the sensor LS001. When the output LS001.S is larger than 3 (LS001.S>3), the controller PLC001 outputs the command (MV001.C=0) to close the valve 001. When the output LS001.S is equal to 3 (LS001.S=3), the controller PLC001 outputs a command to maintain the valve MV001 in the current state. When the output LS001.S is smaller than 3 (LS001.S<3), the controller PLC001 outputs a command (MV001.C=1) to open the valve 001. The normal rule of the controller PLC001 is the controller rule created by the controller rule creating unit 12.

A physical process rule for changing the water level in the water storage tank WT001 is set in the normal rule of the water storage tank WT001 in accordance with the open/closed state of the valve MV001. When the valve MV001 is opened, the water level in the water storage tank WT001 increases by one stage. When, for example, MV001.A=1 and WT001.1=0, the water level increases and becomes WT001.A=1. The normal rule of the water storage tank WT001 is the physical process rule created by the controller rule creating unit 12.

The physical process rule creating unit 13 is able to create the state list of each component and the physical process rules based on the basic configuration set for each type such as the sensor, the actuator, and the passive equipment. The user may set, for example, the basic configuration that specifies the input and the output in advance for each of the types of the components. Then the physical process rule creating unit 13 creates the state list of each component in accordance with the basic configuration. When the output values of the sensor are continuous values, they may be simplified by discrete numerical values.

The compromised behavior generating unit 16 sets compromised rules for a component that inputs or outputs data. That is, compromised rules that indicate the behavior at the time of infection are set in the actuator, the sensor, and the PLC. In the table shown in FIG. 6, the compromised rules are set in the valve MV001, the sensor LS001, and the controller PLC001.

The compromised rule of the sensor LS001 is a rule in which the output LS001.S of the sensor LS001 has one of 0, 1, 2, 3, 4, and 5. That is, when the sensor LS001 is infected with a virus, the sensor LS001 outputs any value selected from 0 to 5 regardless of the results of the detection of the water level in the water storage tank WT001.

The compromised rule of the valve MV001 is a rule in which MV001.A and MV001.S each have any value. When the valve MV001 is infected with a virus or under the attacker's control, i.e. compromised, each of the actual state MV001.A and the state signal MV001.S has one of 0 (closed state) and 1 (open state). In this way, when the valve MV001, which is an actuator, is infected with a virus, the actual state MV001.A has any value regardless of the command MV001.C. Further, regardless of the actual state MV001.A, the state signal MV001.S to be transmitted to the controller PLC has any value.

The compromised rule of the controller PLC001 is a rule in which MV001.C, which is a command output from the controller PLC001, has any value. When the controller PLC001 is infected with a virus, the command MV001.C of the valve MV001 transmitted from the controller PLC001 has one of 0 and 1 regardless of the output LS001.S. In this way, when the controller PLC001 is infected with a virus, the controller PLC001 sends any command to the valve MV001, which is an actuator.

In the example shown in FIG. 6, processing of the compromised component identification unit 15 will be explained along the flowchart shown in FIG. 3. In this example, the user inputs the state in which the actual water level WT001.A is larger than 4 as the unsafe situation. In S21, the compromised component identification unit 15 sets the variable V1 as WT001.A. In S22, the compromised component identification unit 15 searches for the normal rule that changes the variable V1, that is, the actual water level WT001.A. In Step S24, the compromised component identification unit 15 finds the variable V2 that changes the variable V1 from the normal rules of the water storage tank WT001. The variable V2 becomes MV001.A.

In S25, the compromised component identification unit 15 determines that the rule of the water storage tank WT001 is not the rule of the actuator, the sensor, or the PLC (NO in S25). That is, since the water storage tank WT001 is the physical equipment that neither inputs nor outputs data, the compromised component identification unit 15 does not identify the water storage tank WT001 to be a compromised component. Then in S27, the compromised component identification unit 15 sets the variable V1 as the actual state MV001.A, and then the process goes back to S22.

In S22, the compromised component identification unit 15 searches for a rule that changes the variable V1, that is, the actual state MV001.A. In S24, the compromised component identification unit 15 finds the variable V2 that changes the variable V1 from the normal rule of the valve MV001. The variable V2 becomes the command MV001.C.

In S25, the compromised component identification unit 15 determines that the rule of the valve MV001 is the rule of the actuator, the sensor, or the PLC (YES in S25). In S26, the compromised component identification unit 15 identifies the valve MV001 to be a compromised component and adds the valve MV001 to the list of compromised components. That is, the infection of the valve MV001 causes an unsafe situation. Then, in S27, the compromised component identification unit 15 sets the variable V1 as the command MV001.C, and then the process goes back to S22.

In S22, the compromised component identification unit 15 searches for a rule that changes the variable V1, that is, the command MV001.C. In S24, the compromised component identification unit 15 finds the variable V2 that changes the variable V1 from the normal rule of the controller PLC001. The variable V2 becomes LS001.S.

In S25, the compromised component identification unit 15 determines that the rule of the controller PLC001 is the rule of the actuator, the sensor, or the PLC (YES in S25). In S26, the compromised component identification unit 15 identifies the controller PLC001 to be a compromised component and adds the controller PLC001 to the list of compromised components. That is, the infection of the controller PLC001 causes an unsafe situation. Then, in S27, the compromised component identification unit 15 sets the variable V1 as LS001.S, and then the process goes back to S22.

In S22, the compromised component identification unit 15 searches for a rule for changing the variable V1, that is, LS001.S. In S24, the compromised component identification unit 15 finds the variable V2 that changes the variable V1 from the normal rule of the sensor LS001. The variable V2 becomes the actual water level WT001.A.

In S25, the compromised component identification unit 15 determines that the rule of the sensor LS001 is the rule of the actuator, the sensor, or the PLC (YES in S25). In S26, the compromised component identification unit 15 identifies the sensor LS001 to be a compromised component and adds the sensor LS001 to the list of compromised components. That is, the infection of the sensor LS001 causes an unsafe situation. Then, in S27, the compromised component identification unit 15 sets the variable V1 as WT001.A, and then the process goes back to S22. In S22, the compromised component identification unit 15 searches for a rule that changes the variable V1, and determines that a new rule has not been found (NO in S23). Therefore, the compromised component identification unit 15 sends the list of compromised components back to the assessment manager 11. The valve MV001, the controller PLC001, and the sensor LS001 are identified in the list of compromised components as the compromised components.

Next, in the example shown in FIG. 6, processing of the compromised behavior generating unit 16 will be explained along the flowchart shown in FIG. 4.

In S31, the user selects the sensor LS001 as the selected component C from the list of compromised components. In S32, the compromised behavior generating unit 16 refers to the normal rule of the sensor LS001, which is the selected component C, thereby setting the variable V3. In this example, the actual water level WT001.A in the water storage tank WT001 becomes the variable V3 that changes the output LS001.S of the sensor LS001 from the normal rule of the sensor LS001.

In S33, the compromised behavior generating unit 16 searches for the state list of the variable V3, that is, the actual water level WT001.A. From the state list of the water storage tank WT001, WT001.A becomes {0, 1, 2, 3, 4, 5}. Therefore, when the sensor LS001 is a compromised component, LS001.S is able to have any value selected from among 0, 1, 2, 3, 4, and 5. Accordingly, the compromised behavior generating unit 16 sets LS001.S=0, 1 or 2 or 3 or 4 or 5 as the compromised rule of LS001.

As described above, the compromised behavior generating unit 16 sets the variable V3 that changes the output of the selected component based on the normal rules of the selected component. Then the compromised behavior generating unit 16 acquires a value that the variable V3 can have based on the state list. The compromised behavior generating unit 16 determines the compromised behavior (compromised rules) by setting a value that the variable V3 can have in the normal rules. Accordingly, it is possible to appropriately make an assessment of the security risk when the component is infected with a virus and so on.

The attack scenario generator 14 generates attack scenarios when the sensor LS001 is infected with a virus. In this case, as shown in the thick frame of FIG. 7, the attack scenario generator 14 uses the compromised rule for the sensor LS001 and uses the normal rules for the components other than the sensor LS001. That is, the attack scenario generator 14 uses the normal rules for the water storage tank WT001, the controller PLC001, and the valve MV001. The attack scenario generator 14 generates potential attack scenarios from the rules of the respective components using the model checker.

As described above, the security assessment apparatus 100 according to this embodiment generates the normal rules and the compromised rules. Therefore, the security assessment apparatus 100 is able to automatically generate the model checking rules to make an assessment of the security risk of the PLC. For a large-scale ICS including a large number of PLCs, in particular, it is possible to reduce a great amount of time compared to a case in which rules are manually generated. Further, it is possible to automatically generate an Alloy rule without converting the PLC code into a Unified Model Language (UML) model or the like. Accordingly, it is possible to make an assessment of the security risk of the facility simply and appropriately.

FIG. 8 is a diagram for describing one example of the attack scenarios generated by the attack scenario generator 14. FIG. 8 is a table showing a state in which the components are changed in order from step 1 to step 6. In the plant 200 shown in FIG. 5, the rules and the state lists shown in the table in FIG. 7 are used. FIG. 8 shows a case in which the sensor LS001 is infected with a virus.

In step 1-step 3, the output LS001.S is smaller than 3. Therefore, the valve MV001 is opened and the actual water level WT001.A gradually increases. When the sensor LS001 is infected with a virus, the actual water level WT001.A and the output LS001.S of the sensor LS001 become different from each other (step 4). Therefore, even when the actual water level WT001.A exceeds the threshold 3 as shown in steps 5 and 6, the output LS001.S of the sensor LS001 becomes smaller than the threshold 3. The valve MV001 is kept to be open, and MV001.A and MV001.S are in the open state. Accordingly, water overflows from the water storage tank WT001, which is the unsafe situation. In this way, the output unit 22 displays a table indicating the change in each component to the user along time series as the attack scenario ending in the unsafe situation.

In this embodiment, the attack scenario generator 14 generates the attack scenarios in view of the compromised behavior of the selected component. That is, the attack scenario generator 14 performs model checking based on the compromised rules generated in the compromised behavior generating unit 16, thereby generating the attack scenarios. It is therefore possible to make an assessment of the security risk appropriately.

Figure 9:
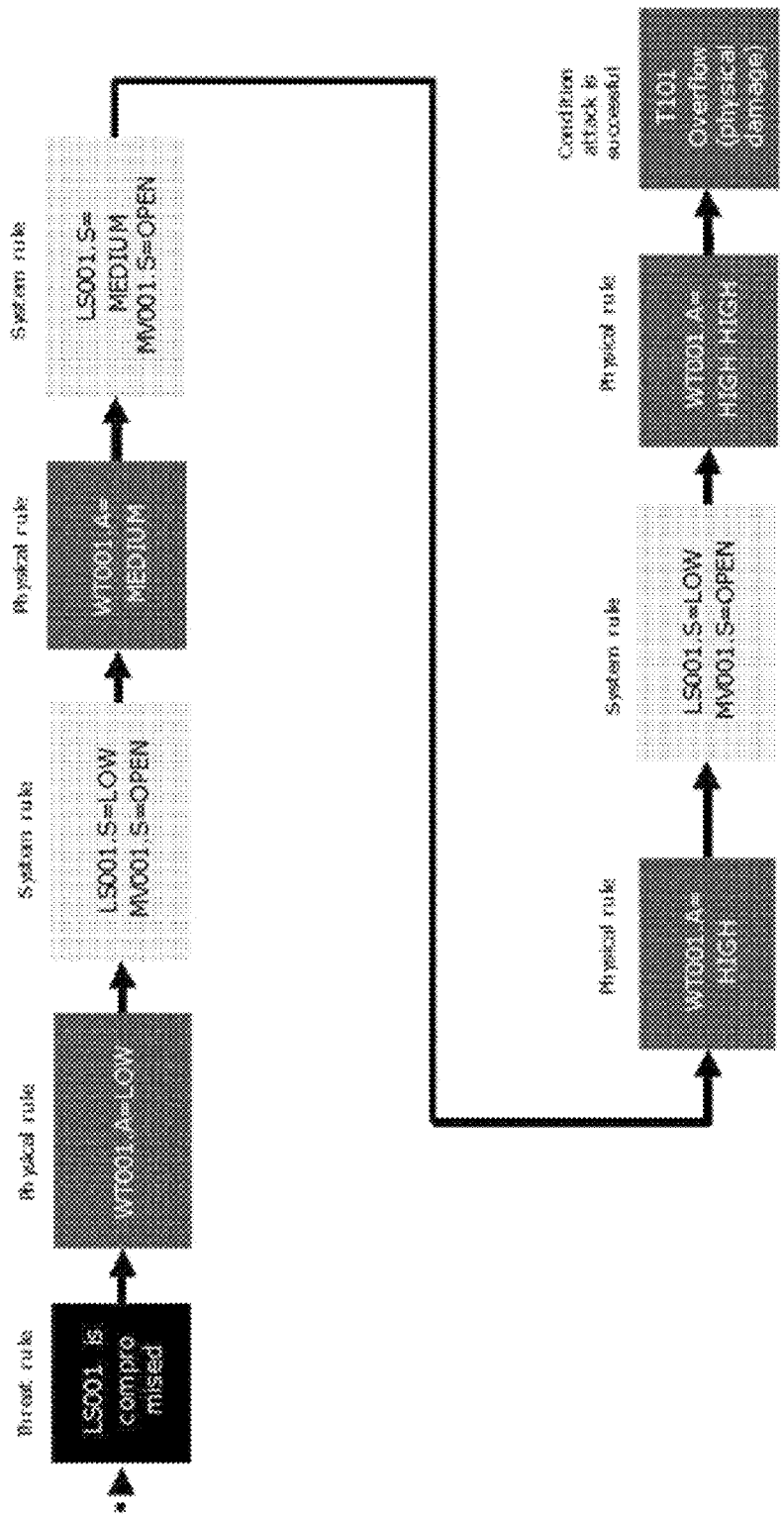
FIG. 9 is a table showing one example of attack scenarios when the compromised component is the sensor LS001.
Figure 10:
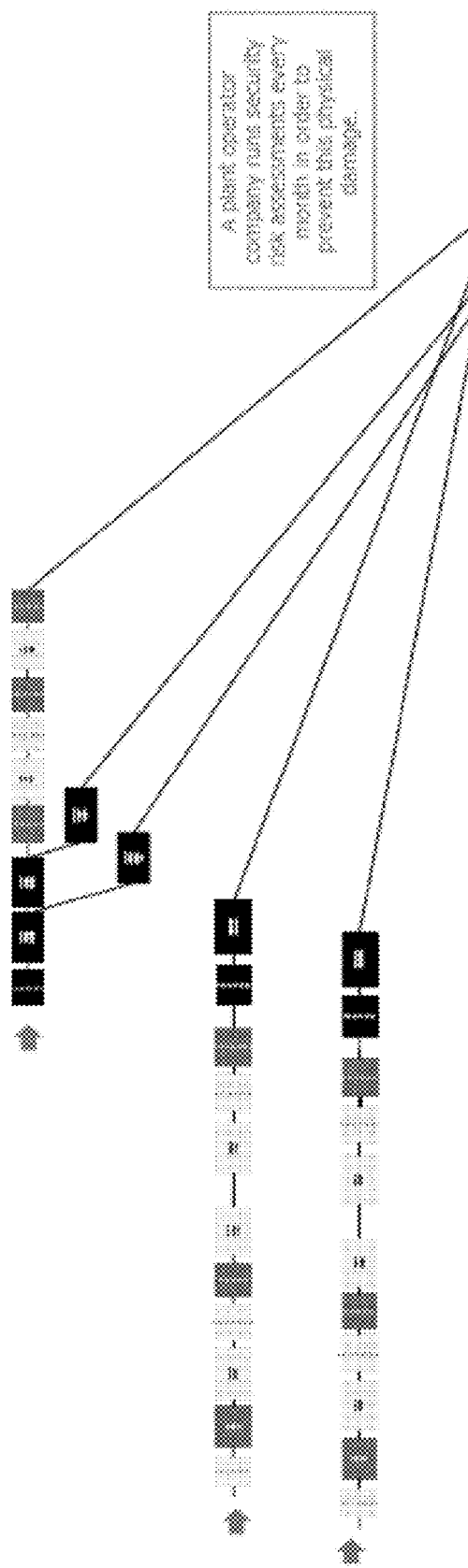
FIG. 10 is a table showing one example of attack scenarios when the compromised component is the sensor LS001.

FIGS. 9 and 10 each show a display form of the attack scenario generated by the attack scenario generator 14. FIGS. 9 and 10 display events of the respective components as a chart along time series. The operator of the plant can regularly check the security assessment in order to avoid physical damages.

Second Embodiment

Figure 11:
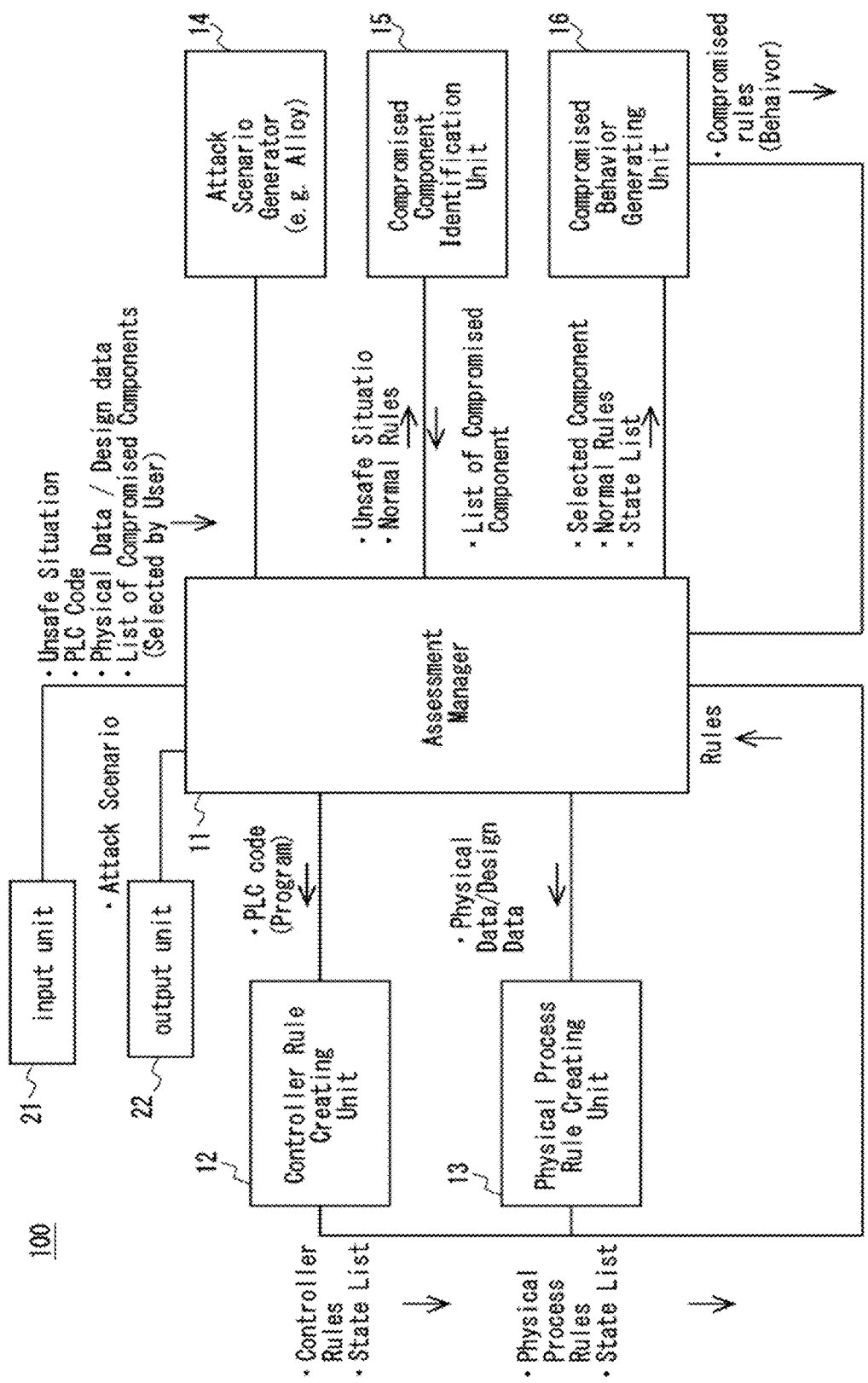
FIG. 11 is a functional block diagram showing a configuration of a security assessment apparatus according to a second embodiment.

With reference to FIG. 11, a security assessment apparatus 100 according to a second embodiment will be explained. FIG. 11 is a functional block diagram showing a configuration of the security assessment apparatus 100. The configuration in the second embodiment is different from the configuration shown in FIG. 1 in that the rule storage unit 17 is not provided in the second embodiment. Therefore, the assessment manager 11 stores each of the rules in the memory or the like and performs processing. According to this configuration as well, the effects similar to those obtained in the first embodiment can be obtained.

The security assessment apparatus 100 in the first and second embodiments may be achieved, for example, by a computer including a processor and a memory. For example, the aforementioned security assessment method is executed by the processor executing a program stored in the memory. It is also possible to achieve the processing of each component by causing a Central Processing Unit (CPU) to execute a computer program.

OTHER EMBODIMENTS

Figure 12:
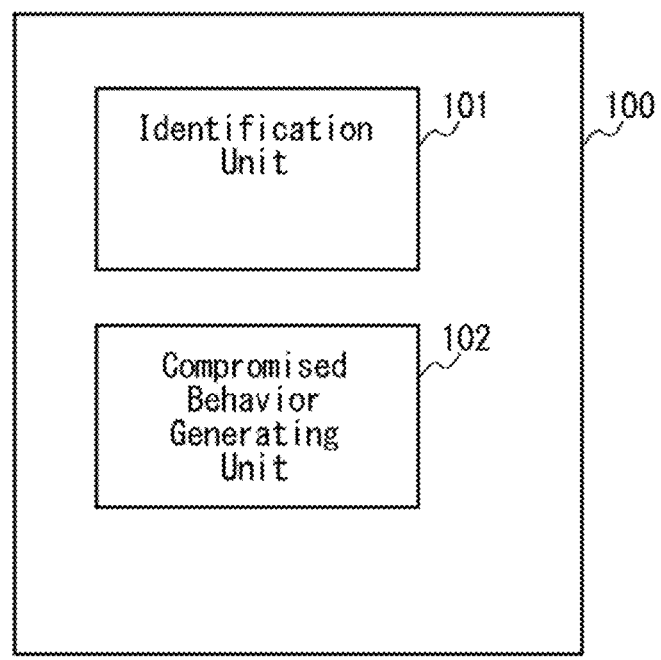
FIG. 12 is a functional block diagram showing a configuration of a security assessment apparatus according to other embodiments.

FIG. 12 is a functional block diagram showing a configuration of a security assessment apparatus 100 according to other embodiments. The security assessment apparatus 100 is a security assessment apparatus of a facility to be controlled using a controller. The security assessment apparatus 100 includes an identification unit 101 configured to identify a compromised component which puts the facility into an unsafe situation based on data regarding the plurality of components and control program code of the controller, thereby generate the list of compromised components, and a compromised behavior generating unit 102 configured to generate a compromised behavior regarding the selected components selected from the list of compromised components. It is therefore possible to make an assessment of the security risk simply and appropriately.

In the aforementioned embodiments, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described above with reference to the embodiments, the present disclosure is not limited to the aforementioned description. Various changes that may be understood by one skilled in the art may be made on the configuration and the details of the present disclosure within the scope of the present disclosure.

REFERENCE SIGNS LIST

11 ASSESSMENT MANAGER
12 CONTROLLER RULE CREATING UNIT
13 PHYSICAL PROCESS RULE CREATING UNIT
14 ATTACK SCENARIO GENERATOR
15 COMPROMISED COMPONENT IDENTIFICATION UNIT
16 COMPROMISED BEHAVIOR GENERATING UNIT
17 RULE STORAGE UNIT
100 SECURITY ASSESSMENT APPARATUS
200 PLANT
LS001 SENSOR
WT001 WATER STORAGE TANK
MV001 VALVE
PLC001 CONTROLLER

What is claimed is:

1. A security assessment apparatus of a facility to be controlled using a controller, comprising:
    an identification unit configured to identify a compromised component which puts the facility into an unsafe situation based on data regarding a plurality of components provided in the facility and control program code of the controller, thereby generating a list of the compromised component; and
    a compromised behavior generating unit configured to generate a compromised behavior of a selected component selected from the list of the compromised component.

2. The security assessment apparatus according to claim 1, wherein
    the identification unit receives a normal rule generated based on the control program code and the data,
    in the normal rule, an input and an output of the component are associated with each other and
    the identification unit identifies the compromised component by searching for the normal rule that changes a value of a variable which identifies the unsafe situation.

3. The security assessment apparatus according to claim 2, wherein
    the compromised behavior generating unit receives a state list generated based on the data and the control program code,
    the state list indicates a state of each component, and
    the compromised behavior generating unit generates the compromised behavior in such a way that the output has any value in the state list that corresponds to the normal rule.

4. The security assessment apparatus according to claim 1, further comprising an attack scenario generator configured to generate an attack scenario when the facility has been subjected to a cyber-attack based on the compromised behavior.

5. The security assessment apparatus according to claim 1, further comprising a controller rule creating unit configured to create a controller rule for the controller to control the component in a normal state.

6. The security assessment apparatus according to claim 1, further comprising a process rule creating unit configured to create a process rule indicating an operation of the component in a normal state.

7. A security assessment method of a facility to be controlled using a controller, the security assessment method comprising:
    identifying a compromised component which puts the facility into an unsafe situation based on data regarding a plurality of components provided in the facility and control program code of the controller;
    generating a list of the compromised component; and
    generating a compromised behavior of a selected component selected from the list of the compromised component.

8. The security assessment method according to claim 7, further comprising:
    generating a normal rule in which an input and an output of the component in a normal state are associated with each other based on the control program code and the data,
    wherein the compromised component is identified by searching for the normal rule that changes a value of a variable which identifies the unsafe situation.

9. The security assessment method according to claim 8, further comprising:
- generating a state list indicating a state of each component based on the data and the control program code,
- wherein the compromised behavior is generated in such a way that the output has any value in the state list that corresponds to the normal rule.

10. The security assessment method according to claim 7, further comprising generating an attack scenario when the facility has been subjected to a cyber-attack based on the compromised behavior.

11. The security assessment method according to claim 7, further comprising creating a controller rule for the controller to control the component in a normal state.

12. The security assessment method according to claim 7, further comprising generating a process rule indicating an operation of the component in a normal state.

13. A non-transitory computer readable medium storing a program for causing a computer to execute a security assessment method of a facility to be controlled using a controller, the security assessment method comprising:
- identifying a compromised component which puts the facility into an unsafe situation based on data regarding a plurality of components provided in the facility and control program code of the controller;
- generating a list of the compromised component; and
- generating a compromised behavior of a selected component selected from the list of the compromised component.

14. The non-transitory computer readable medium according to claim 13, the security assessment method further comprising generating a normal rule in which an input and an output of the component in a normal state are associated with each other based on the control program code and the data,
- wherein the compromised component is identified by searching for the normal rule that changes a value of a variable which identifies the unsafe situation.

15. The non-transitory computer readable medium according to claim 14, the security assessment method further comprising generating a state list indicating a state of each component based on the data and the control program code,
- wherein the compromised behavior is generated in such a way that the output has any value in the state list that corresponds to the normal rule.

16. The non-transitory computer readable medium according to claim 13, the security assessment method further comprising generating an attack scenario when the facility has been subjected to a cyber-attack based on the compromised behavior.

17. The non-transitory computer readable medium according to claim 13, the security assessment method further comprising creating a controller rule for the controller to control the component in a normal state.

18. The non-transitory computer readable medium according to claim 13, the security assessment method further comprising generating a process rule indicating an operation of the component in a normal state.

* * * * *